Dec. 9, 1924.
F. W. BREHM
1,518,835
RISING FRONT MECHANISM FOR CAMERAS
Filed Aug. 21, 1922
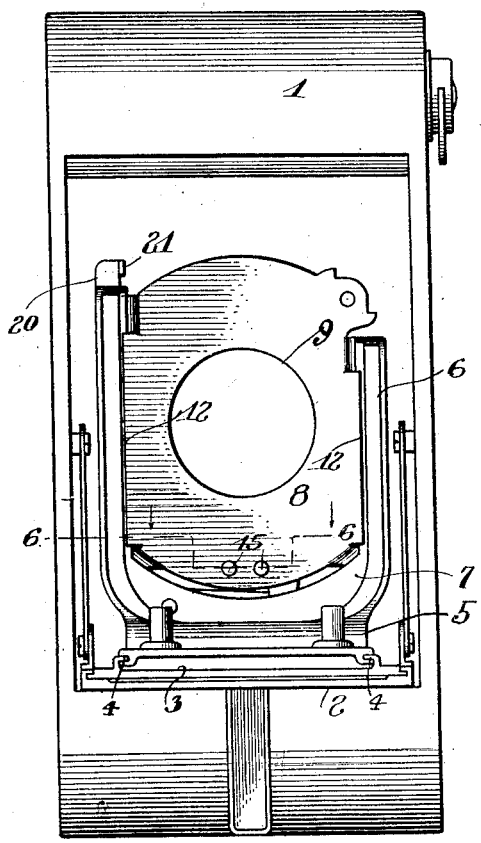
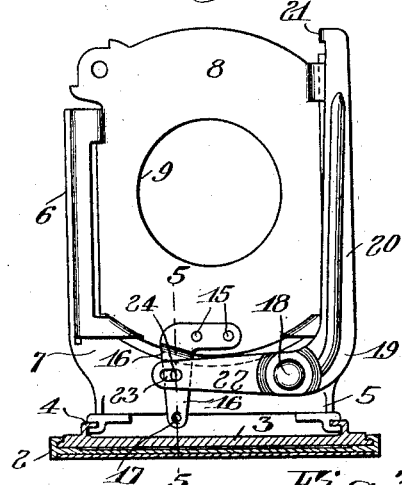
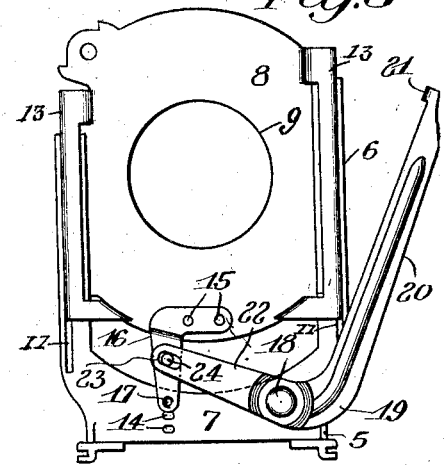
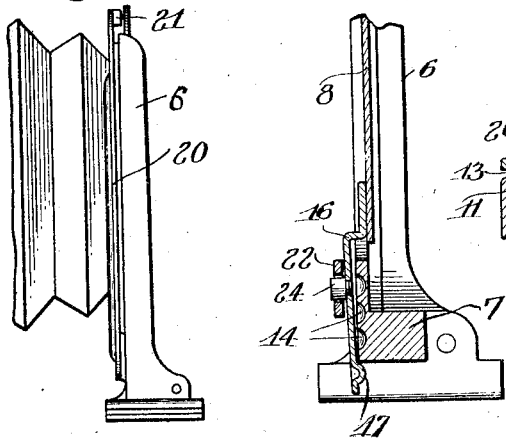
INVENTOR.
Frederick W. Brehm
BY
his ATTORNEY Patented Dec. 9, 1924.

1,518,835

UNITED STATES PATENT OFFICE.

FREDERICK W. BREHM, OF ROCHESTER, NEW YORK, ASSIGNOR TO EASTMAN KODAK COMPANY, OF ROCHESTER, NEW YORK, A CORPORATION OF NEW YORK.

RISING FRONT MECHANISM FOR CAMERAS.

Application filed August 21, 1922. Serial No. 583,179.

*To all whom it may concern:*

Be it known that I, FREDERICK W. BREHM, a citizen of the United States, residing at Rochester, in the county of Monroe, State of New York, have invented certain new and useful Improvements in Rising Front Mechanism for Cameras, of which the following is a specification.

My present invention relates to photography and more particularly to photographic cameras and it has for its object to improve the mechanism whereby the lens board of a camera front is raised and lowered to change the axis of the lens on the field of exposure and it has for its object to provide a simple, efficient and convenient mechanism of this character that will be inconspicuous when applied to the camera front but effective in use.

To these and other ends the invention consists in certain improvements and combination of parts all as will be hereinafter more fully described, the novel features being pointed out in the claims at the end of the specification.

In the drawings:

Figure 1 is a front view of a camera provided with a front constructed in accordance with and illustrating one embodiment of my invention.

Figure 2 is a transverse section through the bed thereof showing a rear elevation of the camera front in one position.

Figure 3 is a similar rear view of the camera front showing the parts in another position.

Figure 4 is a side view of the camera front.

Figure 5 is a fragmentary enlarged section taken on the line 5—5 Figure 2.

Figure 6 is a fragmentary enlarged section taken on the line 6—6 of Figure 1.

Similar reference numerals throughout the several views indicate the same parts.

I have illustrated my inprovements in their present embodiment in connection with the familiar type of folding pocket hand camera comprising a body 1 and a bed 2 shown extended in Figure 1 but which when closed constitutes a door for the front of the camera. Movable on the main bed 2 is an extension bed 3 in turn provided with tracks 4 upon which slides the camera front to focus the lens which it carries, the front being also slidable into the body of the camera when the latter is folded.

The front comprises a carriage 5 having parallel vertical arms 6 at the sides rising from a cross beam 7. A lens board 8 having the lens mount opening 9 is supported between the arms and movable vertically thereon for which purpose the arms are provided with guiding ribs 10 on their inner sides and guiding grooves 11 on their rear sides. The lens board 8 may be a metallic plate having a flange 12 engaging the front of each rib 10 and an offset hook flange 13 slidable in each groove 11 at the rear.

In the practice of my invention I provide the cross beam 7 of the carriage or front with the plurality of alined vertically disposed depressions 14 forming stops the desired distance apart. These are preferably on the rear of the carriage so as to be inconspicuous. Near the lower edge of the lens board 8 is riveted or otherwise suitably secured at 15 a spring catch finger 16 having at its lower yielding end a suitable knob like protuberance 17 adapted to lodge in the stop depressions 14 and yieldably lock there although also capable of riding from one depression to another when suitable energy is exerted.

At one side of the center of the carriage and preferably in rear thereof I pivot to the cross beam 7 as at 18 a bell crank lever 19. A long arm 20 of this lever constitutes an operating arm normally lying vertically and along the rear side of one of the side arms 6 of the front as shown in Figures 1, 2 and 6. It terminates in a suitable thumb piece 21 accessible from above the front and lens board. When it is desired to raise the latter, the lever arm 20 is moved laterally as shown in Figure 3. The other and normally horizontally disposed arm 22 of the bell crank is provided at its extremity with a slot 23 engaging a pivot pin 24 on the catch finger 16 so that as the arm 20 is moved outwardly the lens board is moved upwardly as desired and is retained in any one of the desired positions by the catch finger engaging in the stops. The arm 22 is preferably and conveniently shorter than the arm 20 so as to give mechanical advantage to the operator and the engagement of the catch finger not only maintains the lens board in adjusted position but it snaps into the depressions in such a manner as to guide the operator during adjustment.

A lens board adjusting mechanism made in accordance with my invention is convenient to operate and is light and inconspicuous in appearance.

I claim as my invention:

1. In a camera, the combination with a front provided with a plurality of stops, and a lens board movable vertically thereon, of a yielding spring catch on the lens board arranged to ride over and successively cooperate with the stops and means movable relatively to the catch for actuating the lens board.

2. In a camera, the combination with a front provided with a plurality of stops and a lens board movable vertically thereon, of a yielding spring catch on the lens board arranged to ride over and successively cooperate with the stops, a pivot on the catch and a lever pivoted to the front and slidably engaging the pivot on the catch to actuate the board.

3. In a camera, the combination with a front having a cross beam at the bottom and vertical guide posts at the sides, the cross beam between the posts, being provided with a plurality of stops, and a lens board movable vertically on the guide post above the cross beam, of a downwardly projecting spring catch finger on the lens board arranged to ride over and successively cooperate with the stops and means for actuating the lens board.

4. In a camera, the combination with a front and a lens board guided vertically thereon, of a bell crank lever pivoted to the front and having a short arm extending across the front and slidably engaging the lens board to actuate the same and a long operating arm movable laterally of the front and foldable to an upright position along one side thereof.

FREDERICK W. BREHM.